US011228904B2

(12) United States Patent
Zhang et al.

(10) Patent No.: US 11,228,904 B2
(45) Date of Patent: Jan. 18, 2022

(54) APPARATUS, SYSTEM AND METHOD FOR SCE

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 16/663,253

(22) Filed: Oct. 24, 2019

(65) Prior Publication Data
US 2020/0059782 A1 Feb. 20, 2020

Related U.S. Application Data

(63) Continuation of application No. 15/107,640, filed as application No. PCT/JP2014/005847 on Nov. 20, 2014, now Pat. No. 10,652,733.

(30) Foreign Application Priority Data

Dec. 24, 2013 (JP) ................................ 2013-265273

(51) Int. Cl.
*G06F 21/00* (2013.01)
*H04W 12/04* (2021.01)
(Continued)

(52) U.S. Cl.
CPC ....... *H04W 12/04* (2013.01); *H04W 12/0431* (2021.01); *H04W 12/08* (2013.01); *H04L 2463/061* (2013.01); *H04W 84/045* (2013.01)

(58) Field of Classification Search
CPC ............... H04W 84/045; H04W 12/08; H04W 12/0431; H04W 12/04; H04L 2463/061
(Continued)

(56) References Cited

U.S. PATENT DOCUMENTS 6,901,257 B2 * 5/2005 Kubota ................. H04W 36/14
455/439
8,483,154 B2 * 7/2013 Mochizuki .............. H04L 5/003
370/329
(Continued)

FOREIGN PATENT DOCUMENTS

CN 101110672 A 1/2008
CN 101378591 A 3/2009
(Continued)

OTHER PUBLICATIONS

Office Action issued by the Taiwan Intellectual Property Office in counterpart Taiwan Intellectual Application No. 109113159, dated May 29, 2020.
(Continued)

*Primary Examiner* — Josnel Jeudy

(57) ABSTRACT

In order for supporting separate ciphering at an MeNB (20) and an SeNB (30), the MeNB (20) derives separate first and second keys (KUPenc-M, KUPenc-S) from a third key (KeNB). The first key (KUPenc-M) is used for confidentially protecting first traffic transmitted over U-Plane between the MeNB (20) and a UE (10). The first key (KUPenc-M) may be the same as current KUPenc or a new key. The second key (KUPenc-S) is used for confidentially protecting second traffic transmitted over the U-Plane between the UE (10) and the SeNB (30). The MeNB (20) sends the second key (KUPenc-S) to the SeNB (30). The UE (10) negotiates with the MeNB (20), and derives the second key (KUPenc-S) based on a result of the negotiation.

21 Claims, 14 Drawing Sheets

(51) Int. Cl.
　　*H04W 12/0431*　　(2021.01)
　　*H04W 12/08*　　(2021.01)
　　*H04W 84/04*　　(2009.01)
(58) Field of Classification Search
　　USPC .......................................................... 380/279
　　See application file for complete search history.

(56) References Cited

U.S. PATENT DOCUMENTS

| | | | |
|---|---|---|---|
| 9,385,862 | B2 | 7/2016 | Escott et al. |
| 9,526,602 | B1 | 12/2016 | Sharma |
| 10,433,164 | B2* | 10/2019 | Lee ...................... H04W 12/80 |
| 10,575,228 | B2* | 2/2020 | Aminaka ............ H04W 36/125 |
| 2003/0088769 | A1 | 5/2003 | Quick, Jr. et al. |
| 2006/0083200 | A1 | 4/2006 | Emeott et al. |
| 2008/0123861 | A1 | 5/2008 | Chow |
| 2008/0181411 | A1 | 7/2008 | Norman et al. |
| 2010/0056156 | A1 | 3/2010 | Xu et al. |
| 2010/0316223 | A1 | 12/2010 | Blom et al. |
| 2011/0314287 | A1 | 12/2011 | Escott et al. |
| 2012/0033815 | A1 | 2/2012 | Kuo |
| 2012/0164979 | A1 | 6/2012 | Bachmann et al. |
| 2013/0165130 | A1 | 1/2013 | Wu et al. |
| 2013/0287014 | A1 | 10/2013 | Yuk et al. |
| 2013/0343280 | A1 | 12/2013 | Lee et al. |
| 2014/0119544 | A1 | 5/2014 | Lee |
| 2015/0126154 | A1 | 5/2015 | Yang |
| 2015/0208236 | A1* | 7/2015 | Xu ........................ H04W 88/06 380/270 |
| 2015/0358813 | A1 | 12/2015 | Lee et al. |
| 2015/0365822 | A1 | 12/2015 | Sharma |
| 2016/0021581 | A1 | 1/2016 | Deenoo et al. |
| 2016/0029213 | A1 | 1/2016 | Rajadurai et al. |
| 2016/0044506 | A1 | 2/2016 | Rajadurai et al. |
| 2016/0157095 | A1* | 6/2016 | Zhang ............... H04W 72/0406 380/273 |
| 2016/0174070 | A1 | 6/2016 | Wager et al. |
| 2016/0174112 | A1 | 6/2016 | Liu et al. |
| 2016/0205547 | A1 | 7/2016 | Rajadurai et al. |
| 2016/0277924 | A1 | 9/2016 | Hapsari et al. |
| 2016/0337848 | A1* | 11/2016 | Chang ............... H04W 12/0431 |
| 2017/0134996 | A1 | 5/2017 | Wang et al. |
| 2018/0091485 | A1 | 3/2018 | Lee et al. |
| 2018/0270654 | A1 | 9/2018 | Rajadurai et al. |
| 2019/0089682 | A1 | 3/2019 | Ryoo et al. |
| 2019/0274183 | A1 | 9/2019 | Pelletier et al. |
| 2020/0015088 | A1* | 1/2020 | Luo ....................... H04L 63/06 |
| 2020/0120492 | A1* | 4/2020 | Xu ........................ H04W 76/27 |
| 2020/0136684 | A1 | 4/2020 | Zhang et al. |

FOREIGN PATENT DOCUMENTS

| | | |
|---|---|---|
| CN | 102238541 A | 11/2011 |
| CN | 102740237 A | 10/2012 |
| CN | 103181102 A | 6/2013 |
| CN | 103327658 A | 9/2013 |
| JP | 2009-253985 | 10/2009 |
| JP | 2015-95675 | 5/2015 |
| TW | 201218835 A1 | 5/2012 |
| TW | I618389 B | 3/2018 |
| WO | 2007/138445 A2 | 12/2007 |

OTHER PUBLICATIONS

U.S. Final Office Action for U.S. Appl. No. 16/842,553 dated Feb. 24, 2021.
Search Query Report from IP.com (performed Feb. 19, 2021).
Search Query Report from IP.com (performed Oct. 22, 2020).
Office Action issued by the United States Patent and Trademark Office in corresponding U.S. Appl. No. 16/842,553, dated Oct. 29, 2020.
Office Action issued by the Taiwan Intellectual Property Office in counterpart Taiwan Intellectual Application No. 108107108, dated Oct. 1, 2019.
3GPP TR 36.842, "Evolved Universal Terrestrial Radio Access (E-UTRA); Study on Small Cell Enhancements for E-UTRA and E-UTRAN—Higher layer aspects (Release 12)", V1.0.0, pp. 1-68, Nov. 2013.
3GPP TR 36.932, "Scenarios and requirements for small cell enhancements for E-UTRA and E-UTRAN (Release 12)", V12.1.0, pp. 1-14, Mar. 2013.
RAN2, "Reply LS on security aspects of protocol architectures for small cell enhancements", 3GPP TSG RAN WG2 Meeting #83bis, R2-133650, Oct. 2013.
NTT Docomo, Inc. et al., "New Work Item Description: Dual Connectivity for LTE—Core Part", 3GPP TSG-RAN Meeting #62, RP-132069, Dec. 2013.
3GPP TS 33.401, "3GPP System Architecture Evolution (SAE); Security architecture (Release 12)", V12.9.0, pp. 1-121, Sep. 2013.
Samsung, "Discussion on security aspects of SCE UP Architecture", 3GPP TSG RAN WG2 Meeting #84, R2-134278, Nov. 2013.
Ericsson, "Security analysis of small cell split PDCP architectures", 3GPP TSG SA WG3 Meeting #73, S3-131006, Nov. 2013.
NSN et al., "SCE Security", 3GPP TSG RAN WG2 Meeting #83bis, R2-133089, Oct. 2013.
Ericsson et al., "Security in dual connectivity", 3GPP TSG RAN WG2 #82, R2-131671, May 2013.
CATT, "Security Challenges of Potential Solutions", 3GPP TSG RAN WG2 Meeting #81 bis, R2-130981, Apr. 2013.
International Search Report and Written Opinion dated Feb. 3, 2015, in corresponding PCT International Application.
Notification of Reasons for Refusal mailed by Japanese Patent Office on Jun. 13, 2017, in counterpart Japanese application No. 2016-541451.
3GPP TS 33.401, "3GPP System Architecture Evolution (SAE); Security architecture (Release 12)", V12.7.0, pp. 1-121, Mar. 2013.
Ericsson (Rapporteur), Summary of email discussion [82#17] [LTE/SCE] Control plane aspects 3GPP TSG-RAN WG2 #83 Tdoc R2-132691, Barcelona, Spain, Aug. 19-23, 2013.
CATT, Transmission of SeNB configuration, 3GPP TSG RAN WG2 Meeting #84 R2-134056 San Francisco, USA, Nov. 11th-Nov. 15th, 2013.
NEC Corporation, Small cell enhancements security aspects, 3GPP TSG SA3 Meeting #73 S3-131000 San Francisco, USA, Nov. 11-15, 2013.
ZTE, Comments to Kenb handling during inter-RAT handover, 3GPP TSG SA WG3 Security—S3#51, S3-080386, Apr. 14-18, 2008.
Notification of Reasons for Refusal dated Dec. 25, 2018, by Japanese Patent Office in counterpart Japanese Patent Application 2018-091067.
Office Action issued by the Taiwan Intellectual Property Office dated Aug. 27, 2018, in Taiwanese Patent Application No. 107102938.
Office Action issued by the Chinese Patent Office in counterpart Chinese Patent Application No. 201480071074.2 dated Sep. 4, 2018.
Taiwan Intellectual Property Office Notification of Examination Opinion Sear Report dated Aug. 24, 2017, Taiwan Patent Application No. 103142106.
Office Action issued by the United States Patent and Trademark Office in corresponding U.S. Appl. No. 16/842,553, dated Jun. 12, 2020.
Chinese Office Action for CN Application No. 201910659700.4 dated Jul. 29, 2021 with English Translation.
NTT Docomo Inc., "Study on Small Cell Enhancements for E-UTRA and E-UTRAN; Higher layer aspects", 3GPP R2-133712, TR36.842, Oct. 18, 2013, pp. 1-52.
U.S. Office Action for U.S. Appl. No. 16/842,553 dated Nov. 16, 2021.
Search Query Report from IP.com (performed Nov. 5, 2021).

\* cited by examiner

APPARATUS, SYSTEM AND METHOD FOR SCE

CROSS-REFERENCE TO RELATED PATENT APPLICATIONS

This application is a continuation of U.S. patent application Ser. No. 15/107,640, filed Jun. 23, 2016, which is a National Stage Entry of International Application No. PCT/JP2014/005847, filed Nov. 20, 2014, which claims priority from Japanese Patent Application No. 2013-265273, filed Dec. 24, 2013. The entire contents of the above-referenced applications are expressly incorporated herein by reference.

TECHNICAL FIELD

The present invention relates to an apparatus, a system and a method for SCE (Small Cell Enhancement) or also called "dual connectivity", and particularly to a technique to manage keys for SCE.

BACKGROUND ART

The protocol architecture for SCE has been studied by 3GPP (3rd Generation Partnership Project) as disclosed in NPLs 1 and 2.

Further, for example, NPL 3 discloses that U-Plane (User-Plane) traffic is transmitted through an MeNB (Master evolved Node B) and an SeNB (Second eNB) in parallel for the purpose of offloading the MeNB.

Furthermore, NPL 4 discloses that for U-Plane protocol architecture disclosed in NPL 3, support of separate ciphering at the MeNB and the SeNB is required.

Note that LTE (Long Term Evolution) security specification is disclosed in NPL 5, for example.

CITATION LIST

Non Patent Literature

NPL 1: 3GPP TR 36.842, "Evolved Universal Terrestrial Radio Access (E-UTRA); Study on Small Cell Enhancements for E-UTRA and E-UTRAN—Higher layer aspects (Release 12)", V1.0.0, 2013-11, Clause 8,1.1, pp. 32-47

NPL 2: 3GPP TR 36.932, "Scenarios and requirements for small cell enhancements for E-UTRA and E-UTRAN (Release 12)", V12.1.0, 2013-03

NPL 3: R2-433650, 3GPP TSG RAN WG2 Meeting #83bis, "Reply security aspects of protocol architectures for small cell enhancements"

NPL 4: RP-132069, 3GPP TSG-RAN Meeting #62, "New Work Item Description; Dual Connectivity for LTE Core Part", Clause 8

NPL 5: 3GPP TS 33.401, "3GPP System Architecture Evolution (SAE); Security architecture (Release 12)", V12.9.0, 2013-09

SUMMARY OF INVENTION

Technical Problem

However, the inventors of this application have found that there is a problem that the existing solutions do not fulfill the requirements disclosed in NPL 4.

Accordingly, an exemplary object of the present invention is to provide a solution for supporting separate ciphering at an MeNB and an SeNB.

Solution to Problem

In order to achieve the above-mentioned object, a radio base station according to first exemplary aspect of the present invention includes: derivation means for deriving a first key from a second key, the first key being used for confidentially protecting traffic transmitted over U-Plane between a different radio base station and a UE (User Equipment) that is wirelessly connected to the radio base station, the traffic being transmitted in parallel with traffic over the U-Plane between the radio base station and the UE, the second key being shared between the radio base station and the UE; and send means for sending the first key to the different radio base station.

Further, a radio base station according to second exemplary aspect of the present invention includes: reception means for receiving a first key from a core network; and send means for sending the first key to a different radio base station in order for the different radio base station to derive a second key used for confidentially protecting traffic transmitted over U-Plane between the different radio base station and a UE wirelessly connected to the radio base station, the traffic being transmitted in parallel with traffic over the U-Plane between the radio base station and the UE.

Further, a radio base station according to third exemplary aspect of the present invention includes: derivation means for deriving a first key from a second key in a similar manner to a handover procedure, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and send means for sending the first key to the different radio base station.

Further, a radio base station according to fourth exemplary aspect of the present invention includes: send means for sending a random value to a different radio base station in order for the different radio base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

Further, a radio base station according to fifth exemplary aspect of the present invention includes: derivation means for deriving a first key from a second key, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and send means for sending the first key to the different radio base station.

Further, a radio base station according to sixth exemplary aspect of the present invention includes: reception means for receiving, from a different radio base station to which a UE is wirelessly connected, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

Further, a radio base station according to seventh exemplary aspect of the present invention includes: reception means for receiving a first key from a different radio base station to which a UE is wirelessly connected; and derivation means for deriving, from the first key, a second key used for confidentially protecting first traffic transmitted over U-Plane between the UE and the radio base station, the first traffic being transmitted in parallel with second traffic over the U-Plane between the different radio base station and the UE, the second key differing from a key used for confidentially protecting the second traffic.

Further, a radio base station according to eighth exemplary aspect of the present invention includes: reception means for receiving a random value from a different radio base station to which a UE is wirelessly connected; and derivation means for deriving, by use of the random value, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

Further, a node according to ninth exemplary aspect of the present invention is placed within a core network. This node includes: derivation means for deriving a key; and send means for sending the key to a radio base station to which a UE is wirelessly connected. The key is used for a different base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

Further, a UE according to tenth exemplary aspect of the present invention includes: negotiation means for negotiating with a radio base station to which the UE is wirelessly connected; and derivation means for deriving, based on a result of the negotiation, a key used for confidentially protecting traffic transmitted over U-Plane between a different radio base station and the UE, the traffic being transmitted in parallel with traffic over the U-Plane between the radio base station and the UE.

Further, a communication system according to eleventh exemplary aspect of the present invention includes: a UE; a first radio base station to which the UE is wirelessly connected; and a second radio base station. The first radio base station is configured to: derive a first key from a second key, the first key being used for confidentially protecting traffic transmitted over U-Plane between the second radio base station and the UE, the traffic being transmitted in parallel with traffic over the U-Plane between the first radio base station and the UE, the second key being shared between the first radio base station and the UE; and send the first key to the second radio base station. The second radio base station is configured to receive the first key from the first radio base station. The UE is configured to: negotiate with the first radio base station; and derive the first key based on a result of the negotiation.

Further, a communication system according to twelfth exemplary aspect of the present invention includes: a UE; a first radio base station to which the UE is wirelessly connected; a second radio base station; and a node placed within a core network. The node is configured to: derive a first key; and send the first key to the first radio base station. The first radio base station is configured to: receive the first key from the node; and send the first key to the second radio base station. The second radio base station is configured to: receive the first key from the first radio base station; and derive, from the first key, a second key used for confidentially protecting traffic transmitted over U-Plane between the UE and the second radio base station, the traffic being transmitted in parallel with traffic over the U-Plane between the UE and the first radio base station. The UE is configured to: negotiate with the first radio base station; and derive the second key based on a result of the negotiation.

Further, a communication system according to thirteenth exemplary aspect of the present invention includes: a UE; a first radio base station to which the UE is wirelessly connected; and a second radio base station. The first radio base station is configured to: derive a first key from a second key, the first key being used for the second different radio base station to derive a third key that is used for confidentially protecting traffic transmitted over U-Plane between the UE and the second radio base station, the traffic being transmitted in parallel with traffic over the U-Plane between the UE and the first radio base station, the second key being shared between the first radio base station and the UE; and send the first key to the second radio base station. The second radio base station is configured to: receive the first key from the first radio base station; and derive the third key by use of the first key. The UE is configured to: negotiate with the first radio base station; and derive the third key based on a result of the negotiation.

Further, a communication system according to fourteenth exemplary aspect of the present invention includes: a UE; a first radio base station to which the UE is wirelessly connected; and a second radio base station. The first radio base station is configured to send a random value to the second radio base station. The second radio base station is configured to: receive the random value from the first radio base station; and derive, by use of the random value, a key used for confidentially protecting traffic transmitted over U-Plane between the UE and the second radio base station, the traffic being transmitted in parallel with traffic over the U-Plane between the UE and the first radio base station. The UE is configured to: negotiate with the first radio base station; and derive the key based on a result of the negotiation.

Further, a method according to fifteenth exemplary aspect of the present invention provides a method of controlling operations in a radio base station. This method includes: deriving a first key from a second key, the first key being used for confidentially protecting traffic transmitted over U-Plane between a different radio base station and a UE that is wirelessly connected to the radio base station, the traffic being transmitted in parallel with traffic over the U-Plane between the radio base station and the UE, the second key being shared between the radio base station and the UE; and sending the first key to the different radio base station.

Further, a method according to sixteenth exemplary aspect of the present invention provides a method of controlling operations in a radio base station. This method includes: receiving a first key from a core network; and sending the first key to a different radio base station in order for the different radio base station to derive a second key used for confidentially protecting traffic transmitted over U-Plane between the different radio base station and a UE wirelessly connected to the radio base station, the traffic being transmitted in parallel with traffic over the U-Plane between the radio base station and the UE.

Further, a method according to seventeenth exemplary aspect of the present invention provides a method of controlling operations in a radio base station. This method includes: deriving a first key from a second key in a similar manner to a handover procedure, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and sending the first key to the different radio base station.

Further, a method according to eighteenth exemplary aspect of the present invention provides a method of controlling operations in a radio base station. This method includes: sending a random value to a different radio base station in order for the different radio base station to derive a key that is used for confidentially protecting traffic transmitted over U-Plane between the different radio base station and a UP wirelessly connected to the radio base station, the traffic being transmitted in parallel with traffic over the U-Plane between the radio base station and the UE.

Further, a method according to nineteenth exemplary aspect of the present invention provides a method of controlling operations in a radio base station. This method includes: deriving a first key from a second key, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and sending the first key to the different radio base station.

Further, a method according to twentieth exemplary aspect of the present invention provides a method of controlling operations in a radio base station. This method includes: receiving, from a different radio base station to which a UE is wirelessly connected, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

Further, a method according to twenty-first exemplary aspect of the present invention provides a method of controlling operations in a radio base station. This method includes: receiving a first key from a different radio base station to which a UP is wirelessly connected; and deriving, from the first key, a second key used for confidentially protecting first traffic transmitted over U-Plane between the UE and the radio base station, the first traffic being transmitted in parallel with second traffic over the U-Plane between the different radio base station and the UE, the second key differing from a key used for confidentially protecting the second traffic.

Further, a method according to twenty-second exemplary aspect of the present invention provides a method of controlling operations in a radio base station. This method includes: receiving a random value from a different radio base station to which a UE is wirelessly connected; and deriving, by use of the random value, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

Further, a method according to twenty-third exemplary aspect of the present invention provides a method of controlling operations in a node placed within a core network. This method includes: deriving a key; and sending the key to a radio base station to which a UE is wirelessly connected. The key is used for a different base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

Further, a method according to twenty-fourth exemplary aspect of the present invention provides a method of controlling operations in a UE. This method includes: negotiating with a radio base station to which the UE is wirelessly connected; and deriving, based on a result of the negotiation, a key used for confidentially protecting traffic transmitted over U-Plane between a different radio base station and the UE, the traffic being transmitted in parallel with traffic over the U-Plane between the radio base station and the UE.

Further, a method according to twenty-fifth exemplary aspect of the present invention provides a method of protecting communication in a mobile communication system including a plurality of base stations, and a UE (User Equipment) connectable to the plurality of base stations for dual connectivity. This method includes: deriving, by a first base station, a second key from a first key; sending, by the first base station, the second key to a second base station; deriving, by the second base station, a third key from the second key; sending, by the first base station, information or parameter relating to a fourth key to the UE; and deriving, by the UE, the fourth key for ciphering of user plane. The third key and the fourth key are the same, and the same key is used for encrypting communication between the second base station and the UE.

Further, a mobile communication system according to twenty-sixth exemplary aspect of the present invention includes: a first base station; a second base station; and a UE (User Equipment) connectable to the first base station and the second base station for dual connectivity. The first base station derives a second key from a first key and sends the second key to the second base station. The second base station derives a third key from the second key. The first base station sends information or parameter relating to a fourth key to the UE. The UE derives the fourth key for ciphering of user plane. The third key and the fourth key are the same, and the same key is used for encrypting communication between the second base station and the UE.

Further, a base station according to twenty-seventh exemplary aspect of the present invention performs dual connectivity in a mobile communication system. This base station includes: a first unit that connects a UE (User Equipment); and a second unit that derives a key from a different key received from a different base station. The derived key is the same as a key derived by the UE and is used for encrypting communication with the UE.

Furthermore, a UE (User Equipment) according to twenty-eighth exemplary aspect of the present invention is used in a mobile communication system. This UE includes: a first unit that connects to a first base station and a second base station for dual connectivity; and a second unit that derives a key. The first unit receives information or parameter relating to a ciphering key from the first base station. The second unit derives the ciphering key. The ciphering key is the same as a key derived by the second base station and is used for encrypting communication with the second base station.

Advantageous Effects of Invention

According to the present invention, it is possible to solve the above-mentioned problem, and thus to provide a solution for supporting separate ciphering at an MeNB and an SeNB.

DESCRIPTION OF EMBODIMENTS

Hereinafter, first to fourth exemplary embodiments of radio base stations, a node and a UE according to the present invention, and a communication system to which these radio base stations, node and UE are applied, will be described with the accompany drawings.

Figure 1:
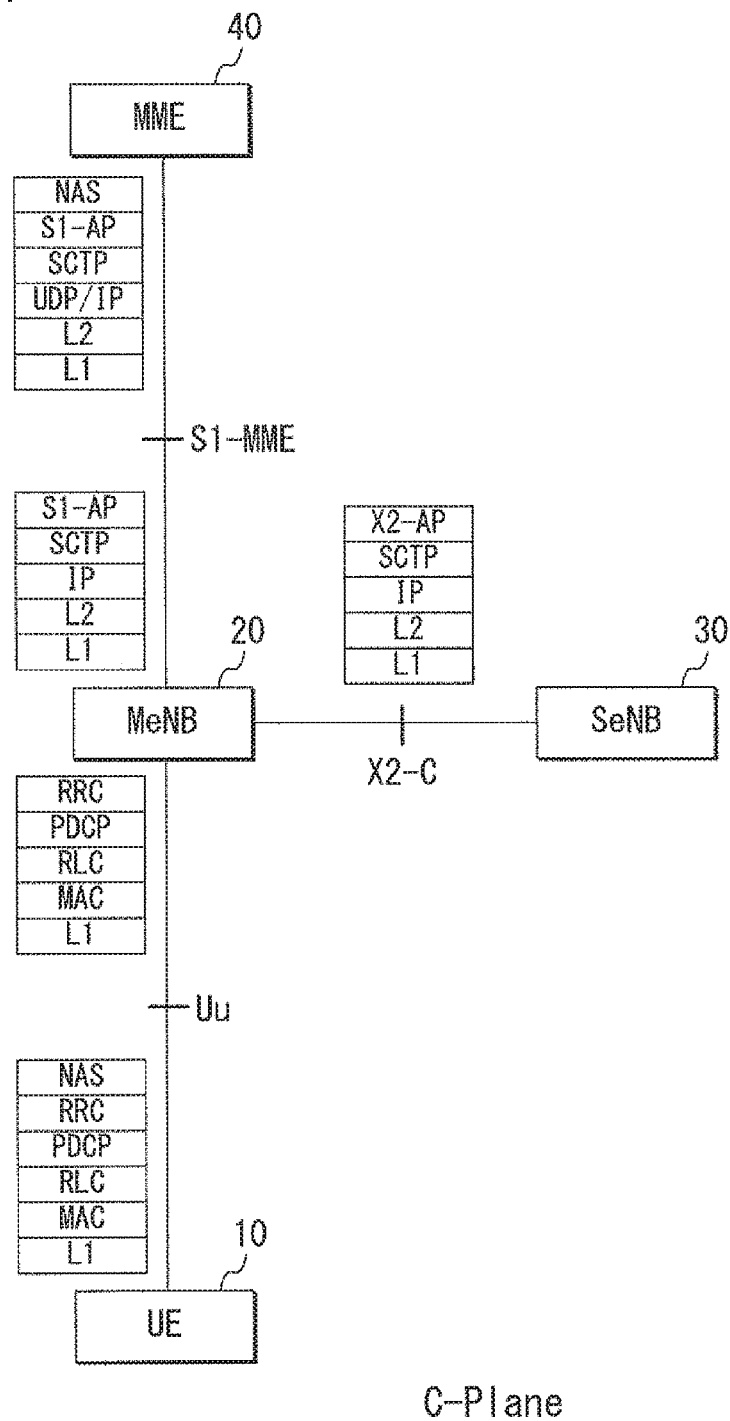
FIG. 1 is a block diagram showing an example of C-Plane protocol architecture in a communication system common to first to fourth exemplary embodiments of the present invention.

FIG. 1 shows an example of C-Plane (Control-Plane) protocol architecture in a communication system common to the first to fourth exemplary embodiments.

For C-Plane, the communication system includes a UE 10, an MeNB 20, an SeNB 30 and an MME (Mobility Management Entity) 40. The UE 10 communicates with the MeNB 20 through a Uu interface. The MeNB 20 communicates with the SeNB 30 through an X2-C interface, and communicates with the MME 40 through an S1-MME interface. Keying related signalling is conducted over the C-Plane.

Figure 2:
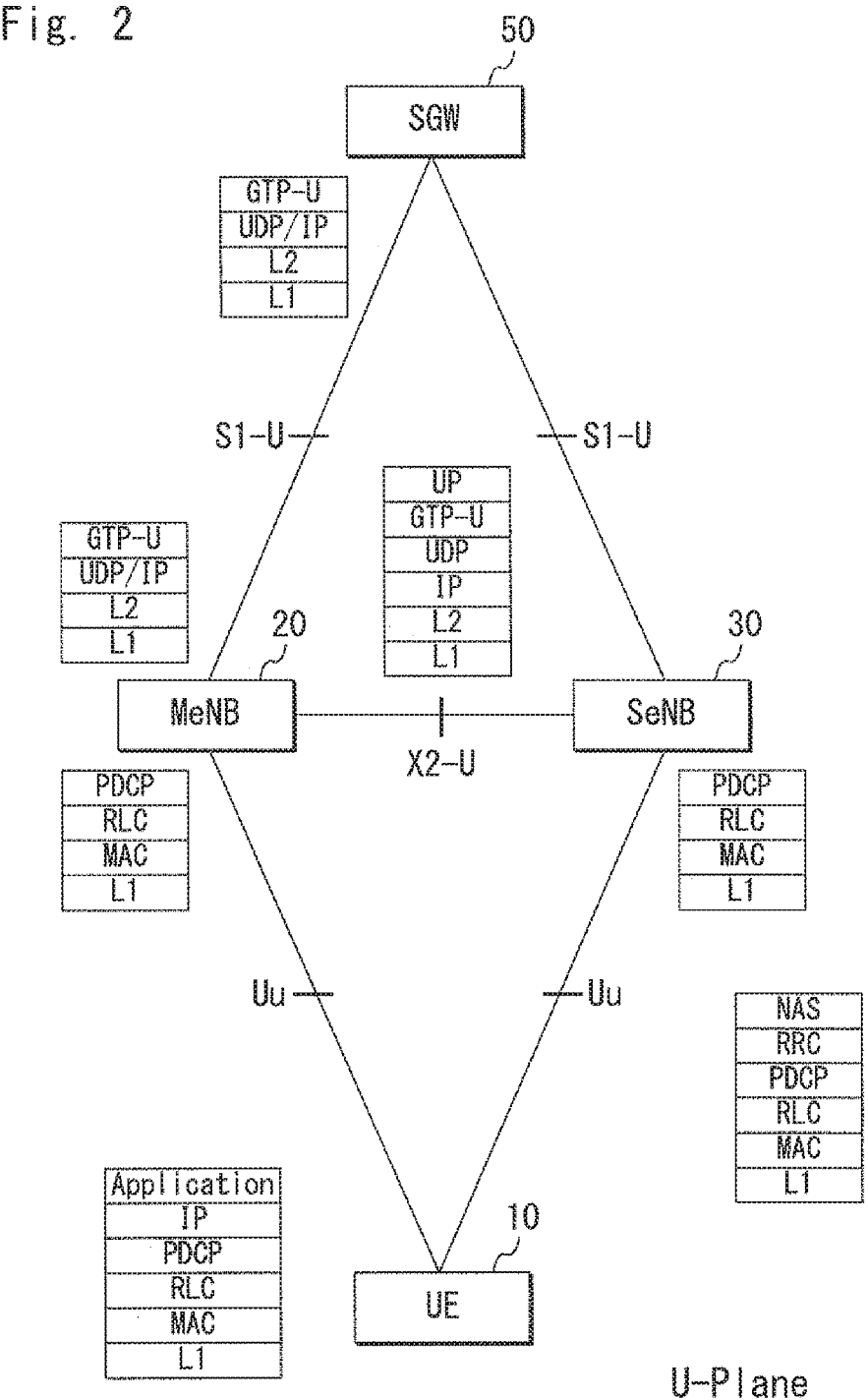
FIG. 2 is a block diagram showing an example of U-Plane protocol architecture in the communication system common to the first to fourth exemplary embodiments.

FIG. 2 shows an example of U-Plane protocol architecture in the communication system.

For U-Plane, the communication system further includes an SOW (Serving Gateway) 50. Each of the MeNB 20 and the SeNB 30 communicates with the SOW 50 through an S1-U interface. In this architecture, U-Plane traffic is transmitted through the MeNB 20 and the SeNB 30 in parallel for the purpose of offloading the MeNB 20 (in other words, for the purpose of offloading the backhaul S1-U interface between the MeNB 20 and the SGW 50).

Next, details of first to fourth exemplary embodiments will be described with reference to FIGS. 3 to 11. Note that configuration examples of the UE 10, the MeNB 20, the SeNB 30 and the MME 40 will be described later with reference to FIGS. 12 to 15.

First Exemplary Embodiment: New Key Based on Same KeNB

In this exemplary embodiment, new keys for confidentially protecting the U-Plane traffic between the UE 10, and the MeNB 20 and the SeNB 30 (hereinafter, sometimes referred to as "UP keys") are derived from the same KeNB. The MeNB 20 derives the UP key for the SeNB 30, and sends it to the SeNB 30.

There are two options as to how to derive the UP keys as follows.

(Option 1)

Figure 3:
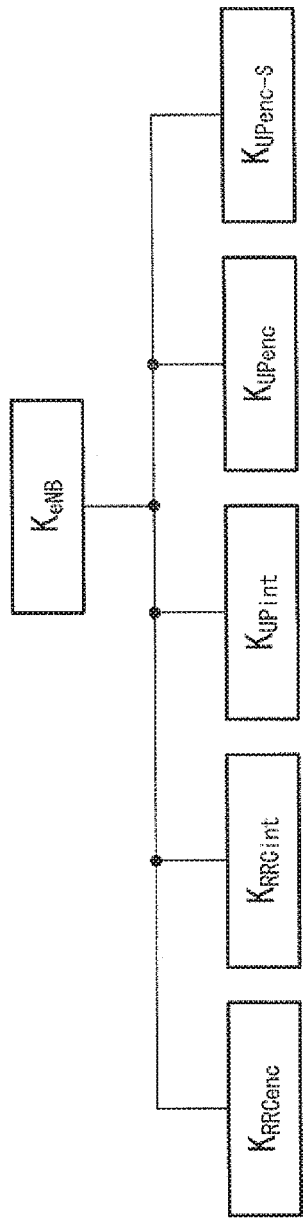
FIG. 3 is a block diagram showing one example of key hierarchy in the communication system according to the first exemplary embodiment.

FIG. 3 shows key hierarchy in this option. The illustrated key hierarchy includes KeNB, KRRCenc, KRRCint, KUPint, KUPenc, and KUPenc-S.

Among them, the KeNB is a key shared upon communication between the UE 10 and the MeNB 20, and can be derived by the UE 10 and the MME 40 from KASME. The KRRCenc is a key which can be derived from the KeNB and used for protecting RRC (Radio Resource Control) traffic with a particular encryption algorithm. The KRRCint is a key which can be derived from the KeNB and used for protecting the RRC traffic with a particular integrity algorithm. The KUPint is a key which can be derived from the KeNB and used for protecting U-Plane traffic between an RN (Relay Node) and a DeNB (Donner eNB) with a particular integrity algorithm. The KUPenc is a key which can be derived from the KeNB and used for protecting U-Plane traffic between a UE and an eNB with a particular encryption algorithm.

On the other hand, the KUPenc-S is a new UP key specific to this exemplary embodiment. KUPenc-M described later in the following option 2 is also a new UP key specific to this exemplary embodiment.

Figure 4:
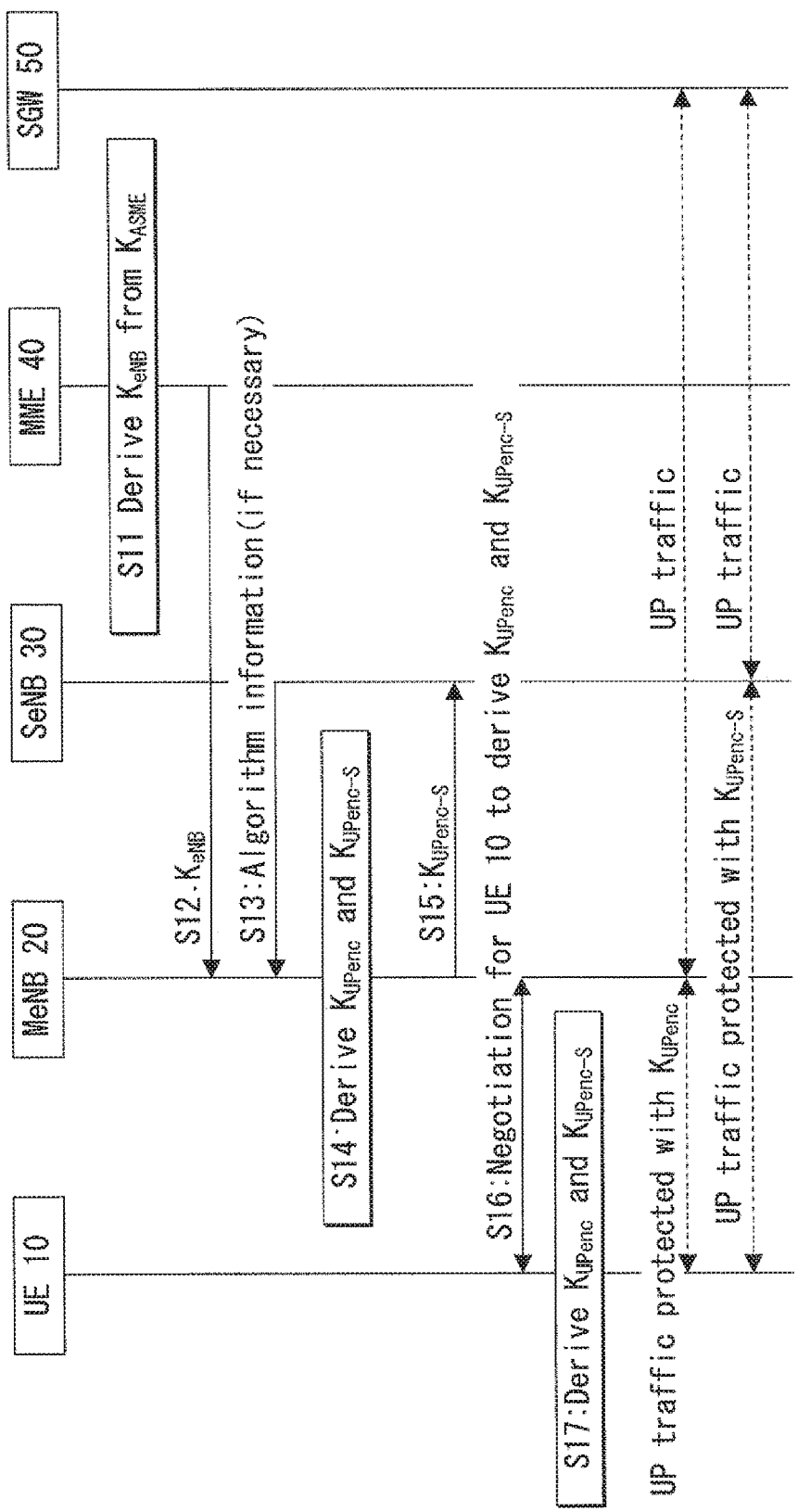
FIG. 4 is a sequence diagram showing an example of operations in the communication system according to the first exemplary embodiment.

In operations, as shown in FIG. 4, the MME 40 firstly derives the KeNB from the KASME (step S11), and then sends the derived KeNB to the MeNB 20 (step S12).

The SeNB 30 informs the MeNB 20 about algorithm information, if necessary (step S13). For example, the algorithm information indicates algorithms for encryption which can be supported by the SeNB 30, or the like.

The MeNB 20 derives, from the received KeNB, the KUPenc and KUPenc-S so as to differ from each other (step S14).

Then, the MeNB 20 sends the derived KUPenc-S to the SeNB 30 (step S15). The MeNB 20 may send to the SeNB 30 other parameters necessary for encryption at the SeNB 30.

In parallel with the above steps S14 and S15, the MeNB 20 negotiates with the UE 10 such that the UE 10 can derive the same KUPenc and KUPenc-S (step S16). Specifically, the MeNB 20 sends to the UE 10 information necessary for deriving the KUPenc-M and KUPenc-S, such as some parameters, indicators indicating encryption algorithms, and the like.

The UE 10 derives the KUPenc-M and KUPenc-S based on the information obtained by the negotiation (step S17).

Note that although the illustration is omitted, the MeNB 20 performs management on the UP keys (particular on the UP key for the SeNB 30) such as update and/or removal of the UP keys, and control for separate PDCP (Packet Data Convergence Protocol) COUNT, The UE 10 also performs management on the UP keys in a similar manner to the MeNB 20. These explanations can be similarly applied to the following option 2 as well as second and third exemplary embodiments.

Thus, as shown by dotted lines in FIG. 4, it is possible to protect U-Plane traffic between the UE 10, and the MeNB 20 and the SeNB 30 with the separate KUPenc and KUPenc-S.

In this option, the KUPenc may be the existing one which can be derived by a typical eNB from the KeNB. In other words, the impact on the existing eNB upon applying this option is only to derive the KUPenc-S, so that it is possible to effectively derive the UP keys.

(Option 2)

Figure 5:
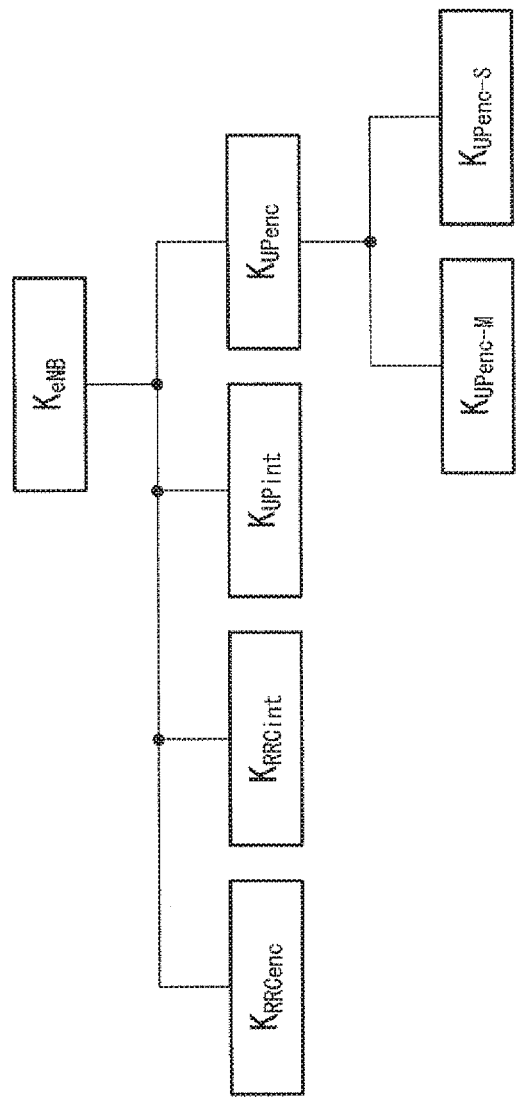
FIG. 5 is a block diagram showing another example of key hierarchy in the communication system according to the first exemplary embodiment.

FIG. 5 shows key hierarchy in this option. The illustrated key hierarchy is different from that shown in FIG. 3, in that separate KUPenc-M and KUPenc-S are derived from the KUPenc.

In operations, as a substitute for the above step S14 shown in FIG. 4, the MeNB 20 firstly derives the KUPenc from the received KeNB, and then derives the KUPenc-M and KUPenc-S from the KUPenc.

In this option, both of KUPenc-M and KUPenc-S are newly derived, so that it is possible to make the U-Plane protection more ensure compared with the option 1.

Second Exemplary Embodiment: New Key Based on Different KeNB

In this exemplary embodiment, UP keys are derived from different KeNB. There are two options as to how to derive the UP keys as follows.

(Option 1)

Figure 6:
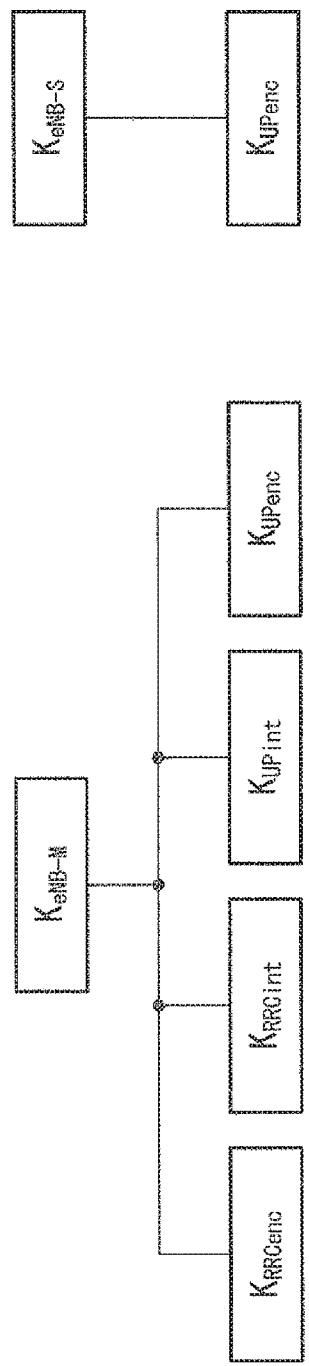
FIG. 6 is a block diagram showing one example of key hierarchy in the communication system according to the second exemplary embodiment.

FIG. 6 shows key hierarchy in this option. The illustrated key hierarchy includes separate KeNB-M and KeNB-S. The KeNB-M is a key used for the MeNB 20 to derive the KRRCenc, the KRRCint, the KUPint and the KUPenc. On the other hand, the KeNB-S is a key used for the SeNB 30 to derive the KUPenc. The KUPenc derived by the MeNB 20 differs from that derived by the SeNB 30, because the KeNB-M and KeNB-S differ from each other.

Figure 7:
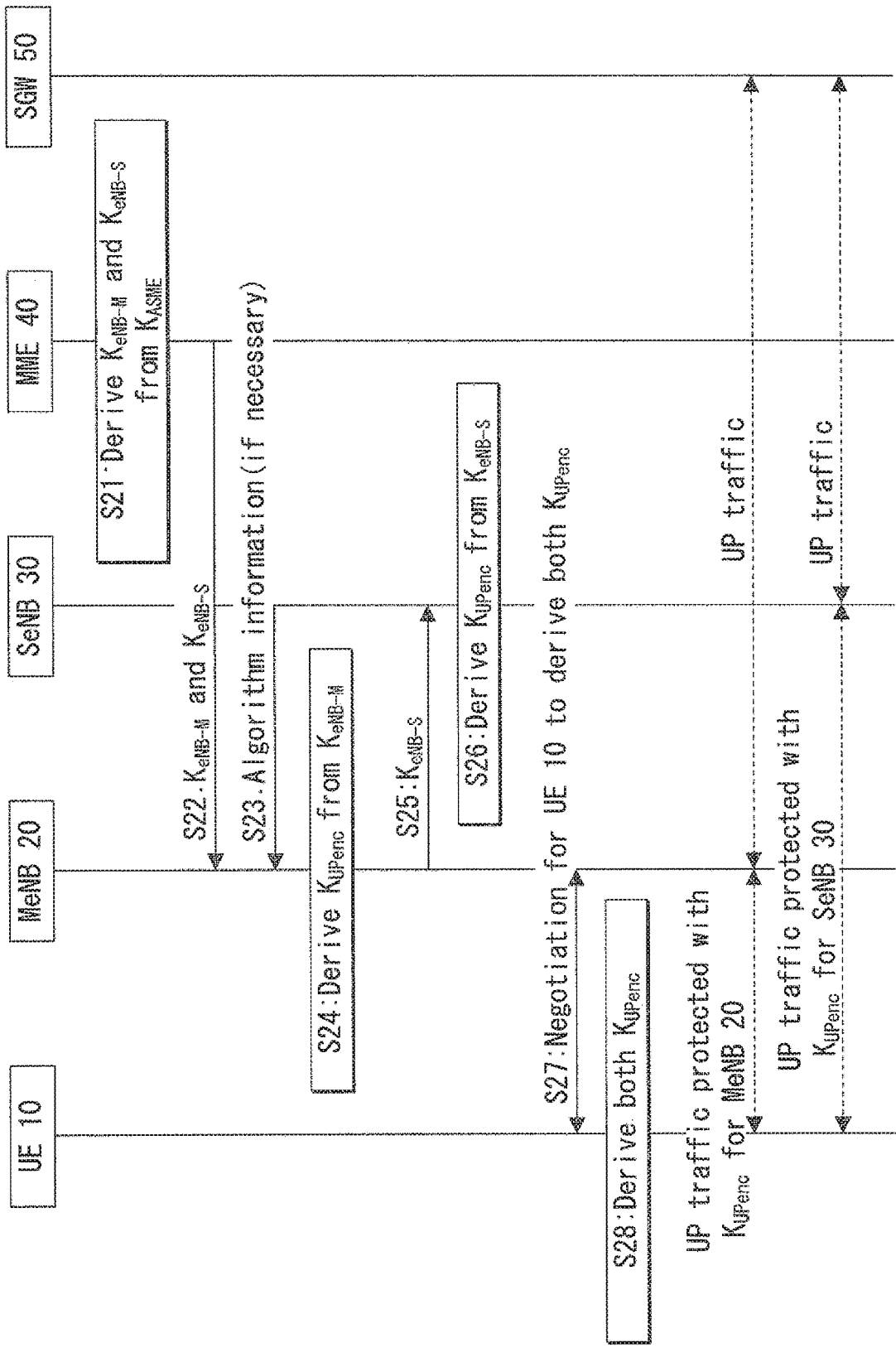
FIG. 7 is a sequence diagram showing one example of operations in the communication system according to the second exemplary embodiment.

In operations, as shown in FIG. 7, the MME 40 firstly derives the separate KeNB-M and KeNB-S from the KASME (step S21), and then sends the derived KeNB-M and KeNB-S to the MeNB 20 (step 522).

The SeNB 30 informs the MeNB 20 about the algorithm information, if necessary (step S23).

The MeNB 20 derives its own KUPenc from the received KeNB-M (step S24), and send the received KeNB-S to the SeNB 30 (step S25).

The SeNB 30 derives its own KUPenc from the received KeNB-S (step S26).

In parallel with the above steps S24 to S26, the MeNB 20 negotiates with the UE 10 such that the UE 10 can derive both KUPenc for the MeNB 20 and the SeNB 30 (step S27). Specifically, the MeNB 20 sends to the UE 10 information necessary for deriving both KUPenc for the MeNB 20 and the SeNB 30, such as some parameters, indicators indicating encryption algorithms, and the like.

The UE 10 derives both KUPenc for the MeNB 20 and the SeNB 30 based on the information obtained by the negotiation (step S28).

Thus, as shown by dotted lines in FIG. 7, it is possible to protect U-Plane traffic between the UE 10, and the MeNB 20 and the SeNB 30 with the separate UP keys.

(Option 2)

Figure 8:
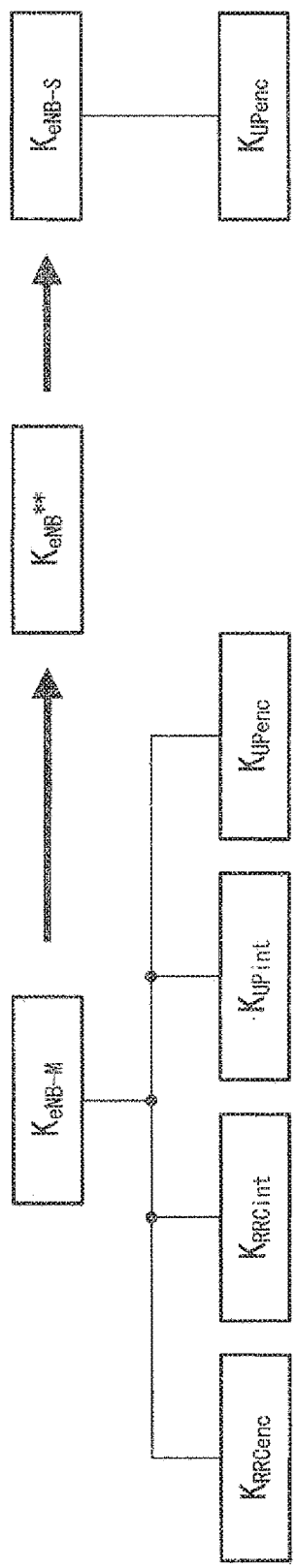
FIG. 8 is a block diagram showing another example of key hierarchy in the communication system according to the second exemplary embodiment.

FIG. 8 shows key hierarchy in this option. The illustrated key hierarchy is different from that shown in FIG. 6, in that KeNB is derived from the KeNB-M in a similar manner to a typical handover procedure, and that the KeNB is used as the KeNB-S. The KeNB is sent from the MeNB 20 to the SeNB 30**.

Figure 9:
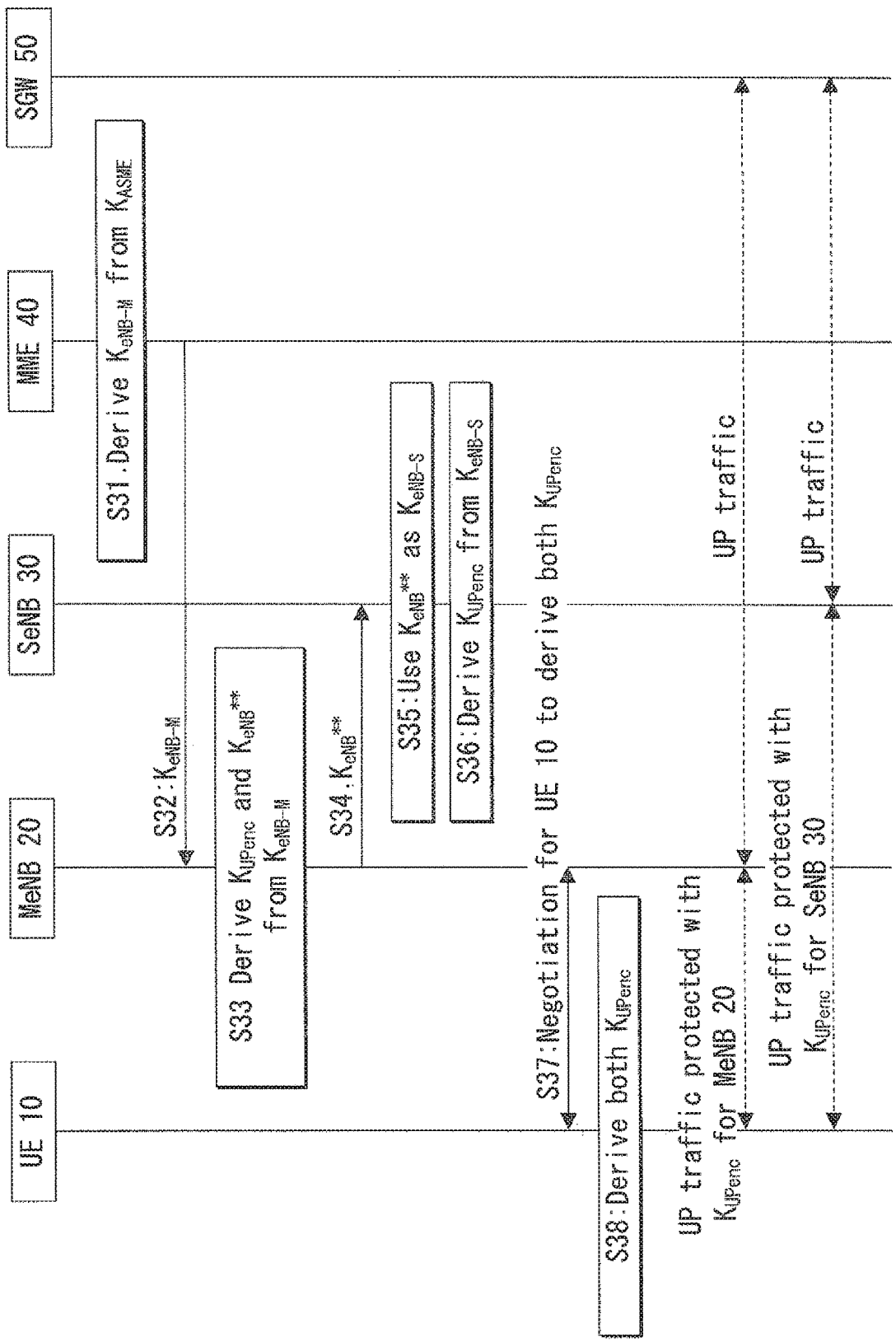
FIG. 9 is a sequence diagram showing another example of operations in the communication system according to the second exemplary embodiment.

In operations, as shown in FIG. 9, the MME 40 firstly derives the KeNB-M from the KASME (step S31), and then sends the derived KeNB-M to the MeNB 20 (step S32).

The MeNB 20 derives the KUPenc, and derives the KeNB from the received KeNB-M as in handover (step S33**).

Moreover, the MeNB 20 sends the derived KeNB to the SeNB 30 (step S34**).

The SeNB 30 uses the KeNB as KeNB-S (step S35), and then derives its own KUPenc from the KeNB-S (step S36**).

In parallel with the above steps S33 to S36, the MeNB 20 negotiates with the UE 10 such that the UE 10 can derive both KUPenc for the MeNB 20 and the SeNB 30 (step S37). Specifically, the MeNB 20 sends to the UE 10 information necessary for deriving both KUPenc for the MeNB 20 and the SeNB 30, such as some parameters, indicators indicating encryption algorithms, and the like.

The UE 10 derives both KUPenc for the MeNB 20 and the SeNB 30 based on the information obtained by the negotiation (step S38).

Thus, as shown by dotted lines in FIG. 9, it is possible to protect U-Plane traffic between the UE 10, and the MeNB 20 and the SeNB 30 with the separate UP keys as with the option 1.

Moreover, in this option, the KeNB-M may be the existing KeNB. Therefore, it is possible to minimize the impact on the existing MME upon applying this option.

Third Exemplary Embodiment: New Key Based on different parameter

In this exemplary embodiment, UP keys are derived based on different parameters.

Figure 10:
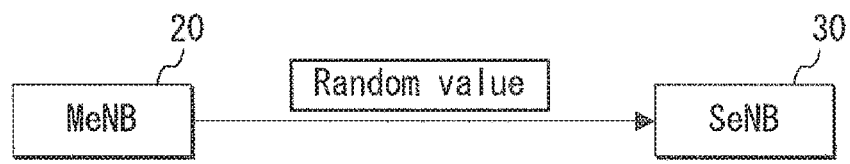
FIG. 10 is a block diagram showing an example of operations in the communication system according to the third exemplary embodiment.

Specifically, as show in FIG. 10, the MeNB 20 sends a random value (random number) to the SeNB 30. The SeNB 30 derives its own UP key by using the random value received from the MeNB 20. Parameters for deriving the UP key for the SeNB 30, or the like can be send from the MeNB 20 to the UE 10 upon the negotiation.

Thus, in this exemplary embodiment, it is possible to protect U-Plane traffic between the UE 10, and the MeNB 20 and the SeNB 30 with the separate UP keys as with the above-mentioned first and second exemplary embodiments.

Moreover, in this exemplary, the UP key itself is not sent from the MeNB 20 to the SeNB 30. Therefore, it is possible to prevent the UP key from being maliciously intercepted.

Fourth Exemplary Embodiment

Figure 11:
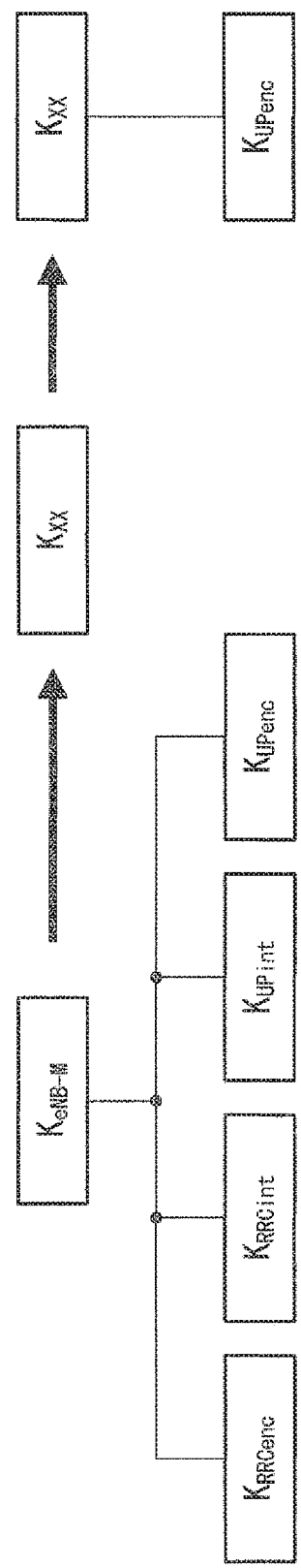
FIG. 11 is a block diagram showing an example of key hierarchy in the communication system according to the fourth exemplary embodiment.

FIG. 11 shows key hierarchy in this exemplary embodiment. The illustrated key hierarchy is different from that shown in FIG. 8, in that as a substituted for the KeNB, KXX is derived from the KeNB-M, and that the KUPenc for the SeNB 30 is derived from the KXX. The KXX is sent from the MeNB 20 to the SeNB 30**.

in operations, although the illustration is omitted, the MeNB 20 derives its own KUPenc, and derives the KXX from the KeNB-M. Then, the MeNB 20 sends the derived KXX to the SeNB 30.

The SeNB 30 derives its own KUPenc from the KXX.

In parallel with these processes, the MeNB 20 negotiates with the UE 10 such that the UE 10 can derive both KUPenc for the MeNB 20 and the SeNB 30. Specifically, the MeNB 20 sends to the UE 10 information necessary for deriving both KUPenc for the MeNB 20 and the SeNB 30, such as some parameters, indicators indicating encryption algorithms, and the like.

The UE 10 derives both KUPenc for the MeNB 20 and the SeNB 30 based on the information obtained by the negotiation.

Thus, it is possible to protect U-Plane traffic between the UE 10, and the MeNB 20 and the SeNB 30 with the separate UP keys as with the above-mentioned first to third exemplary embodiments. Moreover, in this exemplary embodiment, the KeNB-M may be the existing KeNB. Therefore, it is possible to minimize the impact on the existing MME upon applying this exemplary embodiment.

Next, configuration examples of the UE 10, the MeNB 20, the SeNB 30 and the MME 40 will be described.

Figure 12:
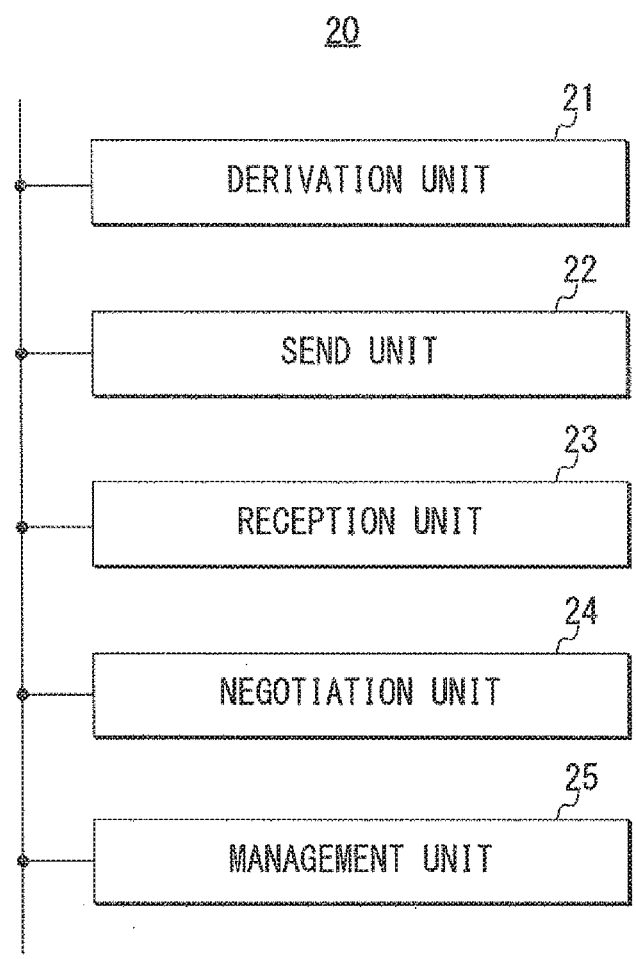
FIG. 12 is a block diagram showing a configuration example of a first radio base station common to the first to fourth exemplary embodiments.

As show in FIG. 12, the MeNB 20 includes a derivation unit 21 and a send unit 22. In the operations shown in FIG. 4, the derivation unit 21 derives the separate KUPenc and KUPenc-S from the KeNB. The send unit 22 sends the KUPenc-S to the SeNB 30. For the operations shown in FIG. 7, the MeNB 20 can further include a reception unit 23. The reception unit 23 receives the separate KeNB-M and KeNB-S from the MME 40. The derivation unit 21 derives the KUPenc from the KeNB-M. The send unit 22 sends the KeNB-S to the SeNB 30. In the operation shown in FIG. 9, the derivation unit 21 derives the KUPenc and the KeNB from the KeNB-M. The send unit 22 sends the KeNB to the SeNB 30. In the operations shown in FIG. 10, the derivation unit 21 derives the KUPenc from the KeNB, for example. The send unit 22 sends the random value to the SeNB 30. Further, the MeNB 20 can also include a negotiation unit 24 which conducts the negotiation with the UE 10. In operations shown in the above-mentioned fourth exemplary embodiment, the derivation unit 21 derives the KUPenc and the KXX from the KeNB-M. The send unit 22 sends the KXX to the SeNB 30. Furthermore, the MeNB 20 can also include a management unit 25 which performs the management on the UP keys. Note that these units 21 to 25 are mutually connected with each other through a bus or the like. These units 21 to 25 can he configured by, for example, a transceiver which conducts communication with the UE 10 though the Uu interface, a transceiver which conducts communication with the SeNB 30 through the X2-C interface, a transceiver which conducts communication with the MME 40 through the S1-MME interface, and a controller such as a CPU (Central Processing Unit) which controls these transceivers.

Figure 13:
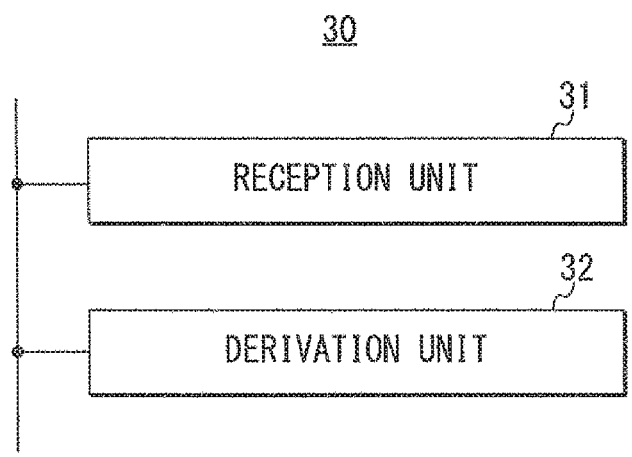
FIG. 13 is a block diagram showing a configuration example of a second radio base station common to the first to fourth exemplary embodiments.

As show in FIG. 13, the SeNB 30 includes at least a reception unit 31. In the operations shown in FIG. 4, the reception unit 31 receives the KUPenc-S from the MeNB 20. For the operations shown in FIGS. 7, 9 and 10, the SeNB 30 can further include a derivation unit 32. In the operations shown in FIG. 7, the reception unit 31 receives the KeNB-S from the MeNB 20. The derivation unit 32 derives the KUPenc from the KeNB-S. In the operations shown in FIG. 9, the reception unit 31 receives the KeNB from the MeNB 20. The derivation unit 32 uses the KeNB as the KeNB-S, and derives the KUPenc from the KeNB-S. In the operations shown in FIG. 10, the reception unit 31 receives the random value from the MeNB 20. The derivation unit 32 derives the KUPenc by use of the random value. In operations shown in the above-mentioned fourth exemplary embodiment, the reception unit 31 receives the KXX from the MeNB 20. The derivation unit 32 derives the KUPenc from the KXX. Note that these units 31 and 32 are mutually connected with each other through a bus or the like. These units 31 and 32 can be configured by, for example, a transceiver which conducts communication with the MeNB 20 through the X2-C interface, and a controller such as a CPU which controls this transceiver.

Figure 14:
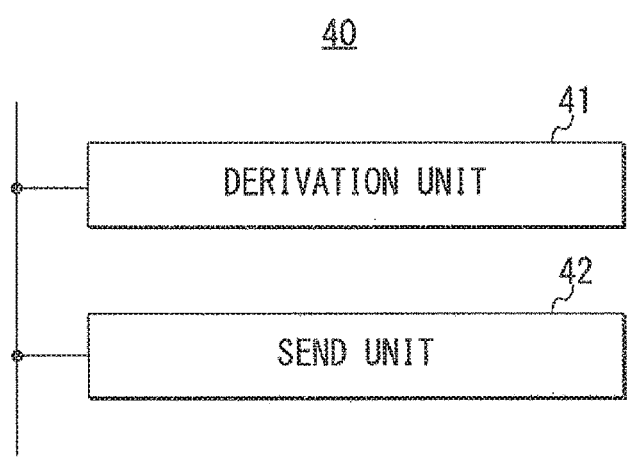
FIG. 14 is a block diagram showing a configuration example of a node according to the second exemplary embodiment.

As show in FIG. 14, the MME 40 includes a derivation unit 41 and a send unit 42 for the operations shown in FIG. 7. The derivation unit 41 derives the KeNB-M and KeNB-S from the KASME. The send unit 42 sends the KeNB-M and KeNB-S to the MeNB 20. Note that these units 41 and 42 are mutually connected with each other through a bus or the like. These units 41 and 42 can be configured by, for example, a transceiver which conducts communication with the MeNB 20 through the S1-MME interface, and a controller such as a CPU which controls this transceiver.

Figure 15:
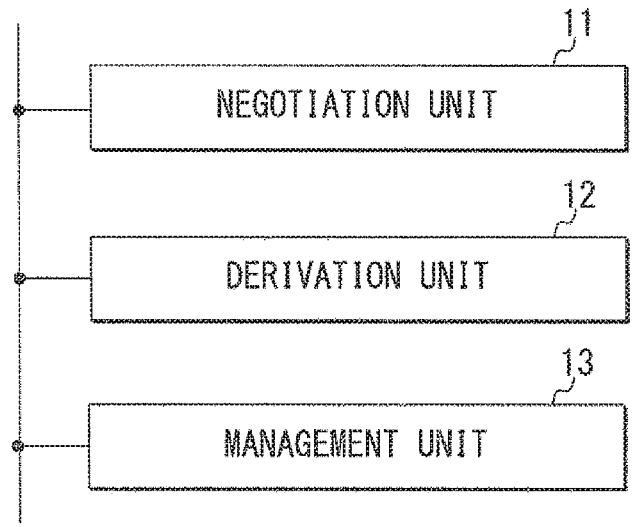
FIG. 15 is a block diagram showing a configuration example of a UE common to the first to fourth exemplary embodiments.

As show in FIG. 15, the UE) includes a negotiation unit 11 and a derivation unit 12. The negotiation unit 11 conducts the negotiation with the MeNB 20. The derivation unit 12 derives the separate UP keys based on the information obtained by the negotiation. Moreover, the UE 10 can include a management unit 13 which performs the management on the UP keys. Note that these units 11 to 13 are mutually connected with each other through a bus or the like. These units 11 to 13 can be configured by, for example, a transceiver which conducts communication with the MeNB 20 through the Uu interface, and a controller such as a CPU which controls this transceiver.

Based on the above description, the following two documents will be proposed to 3GPP.

One of the documents will be proposed as follows.

1. Introduction

SA3 received LS from SA Plenary (SP-130720) requesting summary of potential impacts implied by the solutions identified by RAN (Radio Access Network).

In this contribution we look into security impacts for user plane architecture 1A and propose a response to SAP.

2. Discussion

In this section we discuss security impacts of user plane architecture 1A.

2.1 User plane architecture 1A

Figure 16:
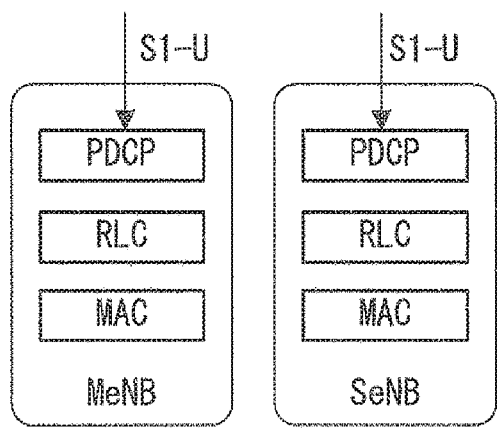
FIG. 16 is a block diagram showing U-Plane architecture 1A disclosed in NPL 1.

A user plane bearer is directly terminated at SeNB and will result in two independent PDCP entities. FIG. 16 depicts option 1A in TR36.842. This means that encryption of the bearer terminated at SeNB should be performed at SeNB PDCP. RRC for option 1A is at MeNB and thus the key management as well. Encryption key is required at SeNB in order to perform ciphering and deciphering of user plane data.

Solution Direction

Option 1: KeNB at MeNB is used for SeNB encryption key derivation and transferred over Xn interface.

Xn is an interface between MeNB and SeNB. Xn should provide sufficient security by, for example, using the same security solution as for S1 and X2.

Impact:

1) MeNB should derive a new key for user plane ciphering between UE and SeNB. The key should be different from the KUPenc.

2) MeNB sends the key and necessary parameter for ciphering to SeNB over X2 interface.

3) MeNB manages PDCP COUNT.

4) UE should derive the same key for user plane ciphering with SeNB.

5) Change to key hierarchy: new key should be added to the current key hierarchy.

6) AS (Access Stratum) SMC (Security Mode Command) procedure may be changed.

Option 2: UE and MeNB use handover procedure to calculate KeNB* for SeNB

UE and MeNB generate KeNB* (or KeNB** to differentiate it from handover case) for SeNB based on KeNB* generation procedure. MeNB generates KeNB* as soon as it decides the dual connectivity and UE does it when it is informed about dual connectivity; SeNB is informed via Xn signalling. RRC messages (e.g. RRC Reconfig complete) still must be encrypted with AS keys at MeNB because RRC is terminated in the MeNB. This option could add key management related complexity in terms of managing different sets of keys for handover and dual connectivity.

Impact:

1) MeNB uses K*eNB generation procedure to derive K*eNB to be used as KSeNB at SeNB.

2) MeNB sends the K*eNB to SeNB over X2 interface.

3) SeNB derives a cipher key for user plan data ciphering from the KSeNB.

4) MeNB sends the key and necessary parameter for ciphering to SeNB over X2 interface.

5) MeNB manages PDCP COUNT.

6) UE should derive the same K*eNB and ciphering k for user plane ciphering with SeNB.

7) Both MeNB and UE should keep the KeNB and perform key management for KSeNB.

8) Change to key hierarchy: new keys should be added to the current key hierarchy.

Option 3: Run new AKA procedure for SeNB.

MME and UE must maintain two active security contexts and handover signalling will also become complex. Modification will also be needed in SMC procedure. AKA (Authentication and Key Agreement) procedure is expensive in terms of additional signalling load and complexity in UE implementation.

Impact:

1) MME and UE should derive and manage two KeNBs for MeNB and SeNB.

2) MME sends the KSeNB via MeNB to SeNB.

3) SeNB should derive a cipher key for user plane ciphering from the KSeNB.

4) MeNB sends the key and necessary parameter for ciphering to SeNB over X2 interface.

5) MeNB manages PDCP COUNT.

6) UE should derive the same key for user plane ciphering with SeNB.

7) Change to key hierarchy: new key should be added to the current key hierarchy.

8) NAS (Non-Access Stratum) and AS SMC procedure may be changed.

Other Issues

Other issues to be studied for all the options are handling of security capabilities, handover and key change on-the-fly.

It would be safe to assume that MeNB and SeNB have the same security capabilities as operator can ensure its deployment. However, if different capabilities are supported then UE must be informed to derive the keys according to supported algorithm in respective nodes.

Based on the above it is clear that in order to protect user plane confidentiality protection between UE and SeNB, there are impacts to current key hierarchy, MeNB and SeNB, UE and/or MME.

Conclusion There are impacts to current key hierarchy, UE and network nodes (eNB and/or MME) for key management.

3. Proposal

We propose the following to SA3:

Reply SA in-line with conclusion 1. A draft LS response to SA in-line with above is provided in S3-131xxx.

Conclusion 1: There are impacts to current key hierarchy, UE and network nodes (eNB and/or MME) for key management.

4. References

1. SP-130720 Response to: LS on Small Cell Enhancement work in RAN

Another one of the documents will be proposed as follows.

1. Overall Description:

SA3 discussed security impacts for user plane architecture 1A and concluded following.

User plane architecture 1A:

SA3 discussed few solutions in order to address security context handling in SeNB with independent PDCP and methods to generate encryption key for SeNB. At this stage, SA3 believes that there will be impacts to current key hierarchy, UE and network entities (eNB and/or MME).

Impact to key hierarchy new key(s) should be added to current key hierarchy

Impact to SMC procedure

AS SMC procedure will be impacted

NAS SMC procedure may be impacted

Impact to MeNB:

MeNB derives and sends the necessary key to SeNB

MeNB performs key management and maintains the PDCP COUNT, since RRC terminates at MeNB MeNB provides parameters for user data ciphering to SeNB MeNB manages any change according to key change on the fly, handover, RRC Connection failure.

Impact to SeNB

SeNB may need to derive a ciphering key

SeNB may need to provide algorithm information to MeNB

Impacts to UE

UE should perform key management for the key(s)

Note that the present invention is not limited to the above-mentioned exemplary embodiments, and it is obvious that various modifications can be made by those of ordinary skill in the art based on the recitation of the claims.

The whole or part of the exemplary embodiments disclosed above can be described as, but not limited to, the following supplementary notes.

(Supplementary Note 1)
A radio base station comprising:
derivation means for deriving a first key from a second key, the first key being used for confidentially protecting traffic transmitted over U-Plane (User-Plane) between a different radio base station and a UE (User Equipment) that is wirelessly connected to the radio base station, the traffic being transmitted in parallel with traffic over the U-Plane between the radio base station and the UE, the second key being shared between the radio base station and the UE; and
send means for sending the first key to the different radio base station.

(Supplementary Note 2)
The radio base station according to Supplementary note 1, wherein the second key comprises standardized KeNB, wherein the derivation means is configured to:
derive standardized KUPenc from the KeNB; and
derive, as the first key, a key differing from the KUPenc.

(Supplementary Note 3)
The radio base station according to Supplementary note 1, wherein the second key comprises standardized KeNB, wherein the derivation means is configured to:
derive standardized KUPenc from the KeNB;
derive, from the KUPenc, the first key and a third key so as to differ from each other, the third key being used for protecting the traffic over the U-Plane between the radio base station and the UE.

(Supplementary Note 4)
The radio base station according to any one of Supplementary notes 1 to 3, further comprising:
negotiation means for negotiating with the UE such that the UE can derive the first key.

(Supplementary Note 5)
The radio base station according to any one of Supplementary notes 1 to 4, further comprising:
management means for performing management on the first key.

(Supplementary Note 6)
A radio base station comprising:
reception means for receiving a first key from a core network; and
send means for sending the first key to a different radio base station in order for the different radio base station to derive a second key used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 7)
The radio base station according to Supplementary note 6, wherein the first key comprises KeNB differing from KeNB allocated to the radio base station.

(Supplementary Note 8)
The radio base station according to Supplementary note 6 or 7, further comprising:
negotiation means for negotiating with the UE such that the UE can derive the second key.

(Supplementary Note 9)
The radio base station according to any one of Supplementary notes 6 to 8, further comprising:
management means for performing management on the second key.

(Supplementary Note 10)
A radio base station comprising:
derivation means for deriving a first key from a second key in a similar manner to a handover procedure, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and
send means for sending the first key to the different radio base station (Supplementary Note 11)
The radio base station according to Supplementary note 10, further comprising:
negotiation means for negotiating with the UE such that the UE can derive the third key.

(Supplementary Note 12)
The radio base station according to Supplementary note 10 or 11 further comprising:
management means for performing management on the third key.

(Supplementary Note 13)
A radio base station comprising:
send means for sending a random value to a different radio base station in order for the different radio base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 14)
The radio base station according to Supplementary note 13, further comprising:
negotiation means for negotiating with the UE such that the UE can derive the key.

(Supplementary Note 15)
The radio base station according to Supplementary note 13 or 14, further comprising:
management means for performing management on the key.

(Supplementary Note 16)
A radio base station comprising:
derivation means for deriving a first key from a second key, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and
send means for sending the first key to the different radio base station.

(Supplementary Note 17)
The radio base station according to Supplementary note 16, further comprising:
negotiation means for negotiating with the UE such that the UE can derive the third key.

(Supplementary Note 18)
The radio base station according to Supplementary note 16 or 17, further comprising:
management means for performing management on the third key.

(Supplementary Note 19)
A radio base station comprising:
reception means for receiving, from a different radio base station to which a UE is wirelessly connected, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

(Supplementary Note 20)

A radio base station comprising:

reception means for receiving a first key from a different radio base station to which a UE is wirelessly connected; and derivation means for deriving, from the first key, a second key used for confidentially protecting first traffic transmitted over U-Plane between the UE and the radio base station, the first traffic being transmitted in parallel with second traffic over the U-Plane between the different radio base station and the UE, the second key differing from a key used for confidentially protecting the second traffic.

(Supplementary Note 21)

A radio base station comprising:

reception means for receiving a random value from a different radio base station to which a UE is wirelessly connected; and derivation means for deriving, by use of the random value, a key used for confidentially protecting first traffic transmitted over U-Plane between the UE and the radio base station, the first traffic being transmitted in parallel with second traffic over the U-Plane between the different radio base station and the UE, the key differing front a key used for confidentially protecting the second traffic.

(Supplementary Note 22)

A node placed within a core network, the node comprising:

derivation means for deriving a key; and send means for sending the key to a radio base station to which a UE is wirelessly connected, wherein the key is used for a different base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 23)

A UE comprising:

negotiation means for negotiating with a radio base station to which the UE is wirelessly connected; and derivation means for deriving, based on a result of the negotiation, a key used for confidentially protecting traffic transmitted over U-Plane between a different radio base station and the UE, the traffic being transmitted in parallel with traffic over the U-Plane between the radio base station and the UE.

(Supplementary Note 24)

The UE according to Supplementary note 23, further comprising:

management means for performing management on the key.

(Supplementary Note 25)

A communication system comprising:

a UE;

a first radio base station to which the UE is wirelessly connected; and a second radio base station, wherein the first radio base station is configured to:

derive a first key from a second key, the first key being used for confidentially protecting traffic transmitted over U-Plane between the second radio base station and the UE, the traffic being transmitted in parallel with traffic over the U-Plane between the first radio base station and the UE, the second key being shared between the first radio base station and the UE; and send the first key to the second radio base station, wherein the second radio base station is configured to receive the first key from the first radio base station, wherein the UE is configured to:

negotiate with the first radio base station; and derive the first key based on a result of the negotiation.

(Supplementary Note 26)

A communication system comprising:

a UE;

a first radio base station to which the UE is wirelessly connected;

a second radio base station; and a node placed within a core network, wherein the node is configured to:

derive a first key; and send the first key to the first radio base station, wherein the first radio base station is configured to:

receive the first key from the node; and send the first key to the second radio base station, wherein the second radio base station is configured to:

receive the first key from the first radio base station; and derive, from the first key, a second key used for confidentially protecting traffic transmitted over U-Plane between the UE and the second radio base station, the traffic being transmitted in parallel with traffic over the U-Plane between the UE and the first radio base station, wherein the UE is configured to:

negotiate with the first radio base station; and derive the second key based on a result of the negotiation.

(Supplementary Note 27)

A communication system comprising:

a UE;

a first radio base station to which the UE is wirelessly connected; and a second radio base station, wherein the first radio base station is configured to:

derive a first key from a second key, the first key being used for the second different radio base station to derive a third key that is used for confidentially protecting traffic transmitted over U-Plane between the UE and the second radio base station, the traffic being transmitted in parallel with traffic over the U-Plane between the UE and the first radio base station, the second key being shared between the first radio base station and the UE; and send the first key to the second radio base station, wherein the second radio base station is configured to:

receive the first key from the first radio base station; and derive the third key by use of the first key, wherein the UE is configured to:

negotiate with the first radio base station; and derive the third key based on a result of the negotiation.

(Supplementary Note 28)

A communication system comprising:

a UE;

a first radio base station to which the UE is wirelessly connected; and a second radio base station, wherein the first radio base station is configured to send a random value to the second radio base station, wherein the second radio base station is configured to:

receive the random value from the first radio base station; and derive, by use of the random value, a key used for confidentially protecting traffic transmitted over U-Plane between the UE and the second radio base station, the traffic being transmitted in parallel with traffic over the U-Plane between the UE and the first radio base station, wherein the UE is configured to:

negotiate with the first radio base station; and derive the key based on a result of the negotiation.

(Supplementary Note 29)

A method of controlling operations in a radio base station, the method comprising:

deriving a first key from a second key, the first key being used for confidentially protecting traffic transmitted over U-Plane between a different radio base station and a UE that is wirelessly connected to the radio base station, the traffic being transmitted in parallel with traffic over the U-Plane between the radio base station and the UE, the second key being shared between the radio base station and the UE; and sending the first key to the different radio base station.

(Supplementary Note 30)

A method of controlling operations in a radio base station, the method comprising:

receiving a first key from a core network; and sending the first key to a different radio base station in order for the different radio base station to derive a second key used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 31)

A method of controlling operations in a radio base station, the method comprising:

deriving a first key from a second key in a similar manner to a handover procedure, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and sending the first key to the different radio base station.

(Supplementary Note 32)

A method of controlling operations in a radio base station, the method comprising:

sending a random value to a different radio base station in order for the different radio base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 33)

A method of controlling operations in a radio base station, the method comprising:

deriving a first key from a second key, the first key being used for a different radio base station to derive a third key that is used for confidentially protecting traffic transmitted over U-Plane between the different radio base station and a UE wirelessly connected to the radio base station, the traffic being transmitted in parallel with traffic over the U-Plane between the radio base station and the UE, the second key being shared between the radio base station and the UE; and sending the first key to the different radio base station.

(Supplementary Note 34)

A method of controlling operations in a radio base station, the method comprising:

receiving, from a different radio base station to which a UE is wirelessly connected, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

(Supplementary Note 35)

A method of controlling operations in a radio base station, the method comprising:

receiving a first key from a different radio base station to which a UE is wirelessly connected; and deriving, from the first key, a second key used for confidentially protecting first traffic transmitted over U-Plane between the UE and the radio base station, the first traffic being transmitted in parallel with second traffic over the U-Plane between the different radio base station and the UE, the second key differing from a key used for confidentially protecting the second traffic.

(Supplementary Note 36)

A method of controlling operations in a radio base station, the method comprising:

receiving a random value from a different radio base station to which a UE is wirelessly connected; and deriving, by use of the random value, a key used for confidentially protecting first traffic transmitted over U-Plane between the UE and the radio base station, the first traffic being transmitted in parallel with second traffic over the U-Plane between the different radio base station and the UE, the key differing from a key used for confidentially protecting the second traffic.

(Supplementary Note 37)

A method of controlling operations in a node placed within a core network, the method comprising:

deriving a key; and sending the key to a radio base station to which a UE is wirelessly connected, wherein the key is used for a different base station to derive a key that is used for confidentially protecting traffic transmitted over U-Plane between the different radio base station and a UE wirelessly connected to the radio base station, the traffic being transmitted in parallel with traffic over the U-Plane between the radio base station and the UE.

(Supplementary Note 38)

A method of controlling operations in a UE, the method comprising:

negotiating with a radio base station to which the UE is wirelessly connected; and deriving, based on a result of the negotiation, a key used for confidentially protecting traffic transmitted over U-Plane between a different radio base station and the UE, the traffic being transmitted in parallel with traffic over the U-Plane between the radio base station and the UE.

This application is based upon and claims the benefit of priority from Japanese patent application No. 2013-265273, filed on Dec. 24, 2013, the disclosure of which is incorporated herein in its entirety by reference.

REFERENCE SIGNS LIST

10 UE
11, 24 NEGOTIATION UNIT
12, 21, 32, 41 DERIVATION UNIT
13, 25 MANAGEMENT UNIT
20 MeNB
22, 42 SEND UNIT 23, 31 RECEPTION UNIT
30 SeNB
40 MME
50 SGW

The invention claimed is:

1. A communication method for a secondary base station in a communication system including a UE (User Equipment), a master base station, and the secondary base station, and having a dual connectivity configuration in which the UE is connected to the master base station and the secondary base station through a UP (User-Plane), the communication method comprising:
receiving a second base station key from the master base station, the second base station key being derived from a first base station key by the master base station;
deriving a UP key for protecting a UP traffic between the UE and the secondary base station from a third base station key based on the second base station key;
sending algorithm information for encryption supported by the secondary base station to the UE via the master base station in a manner such that the UE derives the UP key based on the algorithm information; and
confidentially protecting the UP traffic between the UE and the secondary base station by using the UP key.

2. The communication method according to claim 1, wherein the secondary base station transmits algorithm information for encryption supported by the secondary base station to the master base station.

3. The communication method according to claim 1, wherein the secondary base station is connected to the master base station through an X2 interface.

4. The communication method according to claim 1, wherein the first base station key is derived from a key $K_{ASME}$ by an MME (Mobility Management Entity) and transmitted to the master base station.

5. The communication method according to claim 2, wherein the master base station transmits the algorithm information to the UE and the UE derives the UP key based on the algorithm information.

6. The communication method according to claim 1, wherein the master base station does management of the UP key including update and deletion of the UP key.

7. The communication method according to claim 1, wherein the UE performs control for PDCP (Packet Data Convergence Protocol) COUNT.

8. A secondary base station in a communication system including a UE (User Equipment), a master base station, and the secondary base station, and having a dual connectivity configuration in which the UE is connected to the master base station and the secondary base station through a UP (User-Plane), the secondary base station comprising:
at least one processor; and
at least one memory coupled to the at least one processor, the memory storing instructions that when executed by the processor cause the at least one processor to:
receive a second base station key from the master base station, the second base station key being derived from a first base station key by the master base station,
derive a UP key for protecting a UP traffic between the UE and the secondary base station from a third base station key based on the second base station key,
send algorithm information for encryption supported by the secondary base station to the UE via the master base station in a manner such that the UE derives the UP key based on the algorithm information, and
confidentially protect the UP traffic between the UE and the secondary base station by using the UP key.

9. A communication method for a master base station in a communication system including a User Equipment (UE), the master base station, and a secondary base station, and having a dual connectivity configuration in which the UE is connected to the master base station and the secondary base station through a UP (User-Plane), the communication method comprising:
transmitting a second base station key derived from a first base station key to the secondary base station in a manner such that the secondary base station derives a UP key for protecting a UP traffic between the UE and the secondary base station from a third base station key based on the second base station key;
receiving algorithm information for encryption supported by the secondary base station from the secondary base station; and
transmitting the algorithm information to the UE.

10. The communication method according to claim 9, wherein the secondary base station is connected to the master base station through an X2 interface.

11. The communication method according to claim 9, wherein the first base station key is derived from a key $K_{ASME}$ by an MME (Mobility Management Entity) and transmitted to the master base station.

12. The communication method according to claim 9, wherein the master base station does management of the UP key including update and deletion of the UP key.

13. The communication method according to claim 9, wherein the UE performs control for PDCP (Packet Data Convergence Protocol) COUNT.

14. A master base station in a communication system including a UE (User Equipment), the master base station, and a secondary base station, and having a dual connectivity configuration in which the UE is connected to the master base station and the secondary base station through a UP (User-Plane), the master base station comprising:
at least one processor; and
at least one memory coupled to the at least one processor, the memory storing instructions that when executed by the processor cause the at least one processor to:
transmit a second base station key derived from a first base station key to the secondary base station in a manner such that the secondary base station derives a UP key for protecting a UP traffic between the UE and the secondary base station from a third base station key based on the second base station key,
receive the algorithm information for encryption supported by the secondary base station from the secondary base station, and
transmit the algorithm information to the UE.

15. A communication method for a UE (User Equipment) in a communication system including a master base station and a secondary base station, and having a dual connectivity configuration in which the UE is connected to the master base station and the secondary base station through a UP (User-Plane), the communication method comprising:
receiving algorithm information for encryption supported by the secondary base station from the master base station, the master base station being configured to derive a second base station key from a first base station key;
deriving a UP key based on the algorithm information, the UP key to be used for protecting a UP traffic between the UE and the secondary base station; and confidentially protecting the UP traffic using the UP key between the UE and the secondary base station that derives the UP key from a third base station key based on the second base station key.

16. The communication method according to claim 15, wherein the secondary base station transmits algorithm information for encryption supported by the secondary base station to the master base station.

17. The communication method according to claim 15, wherein the secondary base station is connected to the master base station through an X2 interface.

18. The communication method according to claim 15, wherein the first base station key is derived from a key $K_{ASME}$ by an MME (Mobility Management Entity) and transmitted to the master base station.

19. The communication method according to claim 15, wherein the master base station does management of the UP key including update and deletion of the UP key.

20. The communication method according to claim 15, wherein the UE performs control for PDCP (Packet Data Convergence Protocol) COUNT.

21. A UE (User Equipment) in a communication system including a master base station and a secondary base station, and having a dual connectivity configuration in which the UE is connected to the master base station and the secondary base station through a UP (User-Plane), the UE comprising:
 at least one processor; and
 at least one memory coupled to the at least one processor, the memory storing instructions that when executed by the processor cause the at least one processor to:
  receive algorithm information for encryption supported by the secondary base station from the master base station, the master base station being configured to derive a second base station key from a first base station key,
 derive a UP key based on the algorithm information, the UP Key to be used for protecting a UP traffic between the UE and the secondary base station, and
 confidentially protect the UP traffic using the UP key between the UE and the secondary base station that derives the UP key from a third base station key based on the second base station key.

* * * * *